(12) United States Patent
Sandstrom

(10) Patent No.: US 8,259,741 B2
(45) Date of Patent: Sep. 4, 2012

(54) CONTENT ADAPTIVE DATA PATH LOGIC PROCESSING

(75) Inventor: Mark Sandstrom, Jersey City, NJ (US)

(73) Assignee: Throughputer, Inc., Jersey City, NJ (US)

( * ) Notice: Subject to any disclaimer, the term of this patent is extended or adjusted under 35 U.S.C. 154(b) by 238 days.

(21) Appl. No.: 12/869,955

(22) Filed: Aug. 27, 2010

(65) Prior Publication Data
US 2012/0051368 A1 Mar. 1, 2012

(51) Int. Cl.
H04L 12/28 (2006.01)
(52) U.S. Cl. ......................................... 370/419; 370/537
(58) Field of Classification Search .................. None
See application file for complete search history.

(56) References Cited

U.S. PATENT DOCUMENTS

| 6,366,157 | B1 * | 4/2002 | Abdesselem et al. | 327/535 |
|---|---|---|---|---|
| 7,058,868 | B2 * | 6/2006 | Guettaf | 714/727 |
| 8,059,674 | B2 * | 11/2011 | Cheung et al. | 370/463 |
| 2005/0036515 | A1 | 2/2005 | Cheung | |
| 2007/0291576 | A1 * | 12/2007 | Yang | 365/230.08 |

* cited by examiner

Primary Examiner — David Oveissi

(57) ABSTRACT

Adaptive data processing systems and methods, comprising functions of preparing a primary input from a preliminary primary input, preparing a secondary input from a preliminary secondary input, and producing an output from the primary and secondary inputs, wherein preparing the secondary input is adaptive to contents of the preliminary primary input that is advanced in timing w.r.t. the primary input. Adaptive data processing techniques thus cause the secondary input to be in same frame phase as the primary input for producing the output, even though the secondary input is formed (in part) based on primary input contents, while such forming of the secondary input consumes multiple clock cycles. Moreover, the techniques enable preparing the primary input from the preliminary primary input while the preliminary primary input is used for preparing the secondary input, which, in turn, is used, along with the primary input, in producing the adaptive data processor output.

16 Claims, 2 Drawing Sheets

CONTENT ADAPTIVE DATA PATH LOGIC PROCESSING

CROSS REFERENCE TO RELATED APPLICATIONS

This application claims the benefit of:

[1] U.S. Utility application Ser. No. 12/713,143, filed Feb. 25, 2010, which is incorporated by reference in their entirety.

This application is related to the following, each of which is incorporated by reference in its entirety:

[2] U.S. Utility application Ser. No. 10/170,260, filed Jun. 13, 2002;

[3] U.S. Utility application Ser. No. 11/692,925, filed Mar. 29, 2007; and

[4] U.S. Utility application Ser. No. 12/363,667, filed Jan. 30, 2009.

BACKGROUND

1. Technical Field

The present invention pertains to the field of digital data path and data path control systems, particularly to data content adaptive synchronized data path control logic for dynamic, minimum latency data path processing.

2. Descriptions of Related Art

Conventional network protocol and data processing systems are limited to two primary categories. First, there are synchronous, e.g. time-division multiplexing based techniques, which are used primarily for simpler data transmission and transmission control applications based on pre-configured network usage and operation. Second, there are asynchronous, e.g. packet based, data transmission and processing techniques, used commonly for more complex applications, in particularly such where the network usage and protocol and data processing can be at least in part user application driven, i.e., such where the protocols and content of the incoming data can influence the nature of network operation and data processing.

A major disadvantage of the conventional synchronous systems is that they require the network usage to be pre-configured, i.e., the network (and therefore, at least to a certain a degree, the network connected processing system) capacity allocation between different access points and applications will be what it is pre-configured to be, irrespective of the actual user and application demands. Given that user and application demands are dynamic, time dependent variables and difficult if not impossible to forecast even in average, this static configuration of conventional synchronous systems leads to poor network utilization efficiency.

On the other hand, the conventional asynchronous systems have as a major drawback their unpredictable performance and less reliable operation. This follows from the non-pre-configured nature of conventional asynchronous systems such that any user's or application's data or processing requirements impact the availability of network and processing resources for other users and applications.

To avoid the shortcomings of both conventional synchronous and asynchronous systems while delivering the benefits of them each, innovations are needed to allow simultaneously providing predictable, high-performance networking and data processing system operation, together with efficient system utilization and optimized system throughput.

SUMMARY

Systems and methods disclosed enable adaptive digital control systems for high-efficiency, minimized latency and flexible data path processing. Disclosed inventions involve advancing control logic operation based on preliminary data, to allow the control logic to act in timeslot synchrony with the actual data, in a manner that adapts to contents of such data to be processed, without having to delay the actual data to be processed to compensate for control logic delays.

An embodiment of the invention provides an adaptive digital data processor, comprising: a preliminary primary input, a preliminary secondary input, a primary input, a secondary input, an output, as well as a logic processor producing the output based on the primary and secondary inputs, a primary input processor producing the primary input for the logic processor based on the preliminary input, and a secondary input processor producing the secondary input for the logic processor based on the preliminary secondary input. In such an embodiment, producing the secondary input by the secondary input processor is controlled at least in part by the preliminary primary input contents, to cause the primary input and the secondary input to arrive at processing logic in same digital signal frame phase.

An embodiment of the invention also provides adaptive digital data processing method, comprising steps of: preparing a primary input for a logic processor based at least in part on a preliminary primary input, preparing a secondary input for the logic processor based at least in part on a preliminary secondary input, and producing, by the logic processor, an output, based at least in part on the primary and secondary inputs. In such embodiments, preparing the secondary input is controlled at least in part by contents of the preliminary primary input, causing the secondary and primary inputs to arrive at the logic processor in same frame phase, thus enabling primary data content adaptive, synchronized and minimum latency data processing.

According to embodiments of the invention, a non fully processed, advanced timing version of the primary input— rather than a plain advanced timing, but fully processed, version of the primary input—is used as the preliminary primary input, including for controlling the secondary input processing and, through the secondary input, the actual data path processing. In such embodiments, the primary input signal is being processed, e.g. by setting certain primary input signal overhead fields into their appropriate outgoing values, at the primary input processor, in parallel to the preliminary primary input being used to direct the preparation of the secondary input, which, in turn, is used to control the primary data path processing.

Benefits of the invented content adaptive, synchronous data processing include achieving data content, including protocol and embedded overhead signaling, driven dynamic, synchronous line rate data path processing, eliminating needs for data buffering, thus minimizing latency as well as digital data storage and related wiring requirements and associated costs. The invention thus enable predictable, high-performance data path processing with application data driven adaptable, high-efficiency operation with minimized costs and scalable architecture.

Figure 1:
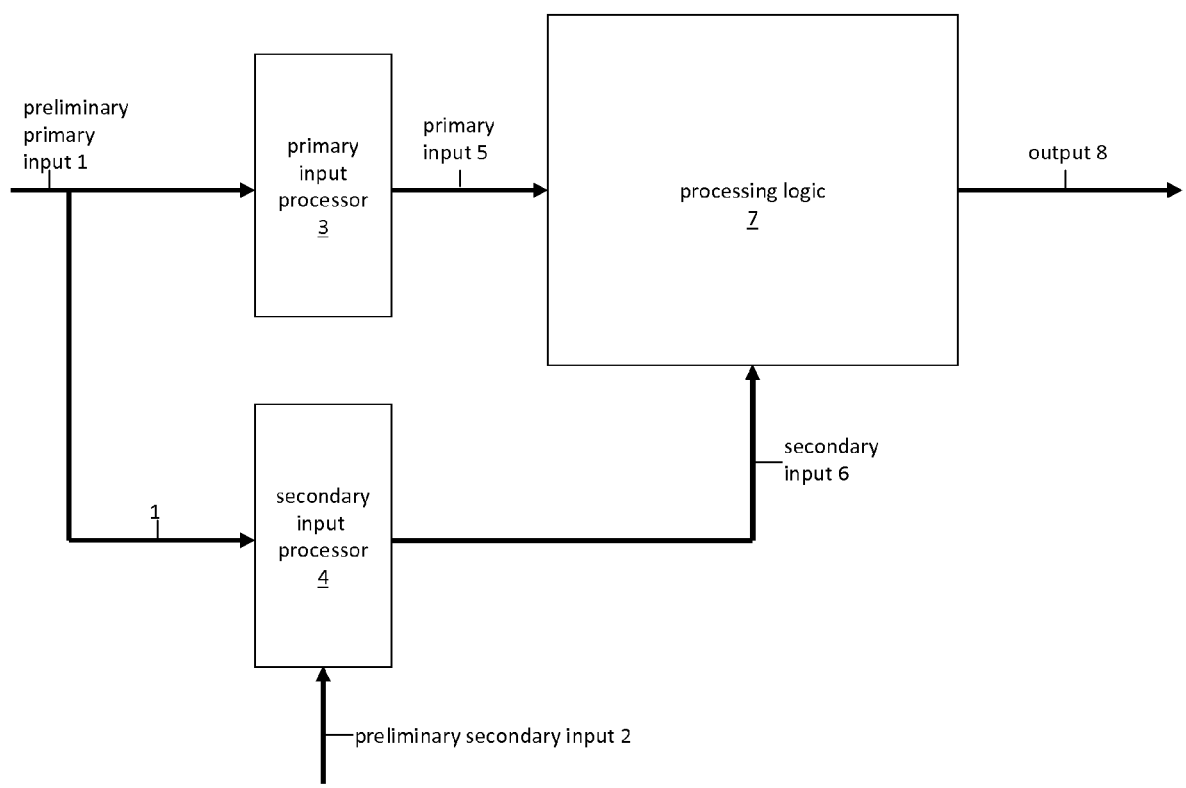
FIG. 1 shows, in accordance with an embodiment of the invention, a functional block diagram for a content adaptive data processing system.

The following symbols and notations used in the drawings:
Boxes indicate a functional logic module, such as a multiplexer.
Solid arrows indicate a data signal flow. Gapped arrows indicate control signal flow. A signal flow may comprise one or more parallel bit wires.

Arrows ending into or beginning from a bus represent joining or disjoining of a sub-flow of data or control signals into or from the bus, respectively.

Lines and arrows between nodes in the drawings represent a logical communication path, and may consist of one or more physical wireline or wireless connections. The direction of arrow does not preclude communication in also the opposite direction, as the directions of the arrows are drawn to indicate the primary direction of data flow with reference to the below description of the drawings.

The figures depict embodiments of the invention for purposes of illustration only. One skilled in the art will readily recognize from the following discussion that alternative embodiments of the structures and methods illustrated herein may be employed without departing from the inventive principles described herein.

DETAILED DESCRIPTION

The invention involves techniques for content adaptive digital data processing, comprising main processing steps of (1) preparing a primary input from a preliminary primary input, (2) preparing a secondary input from a preliminary secondary input, and (3) producing an output from the primary and secondary inputs, wherein the preparing of the secondary input is done at least in part based on control information received via the preliminary primary input, in order to cause the secondary input to be in same digital signal frame phase as the primary input for production of the output.

Functional elements of the invented adaptive digital data processing systems and methods are described in the following in reference to the drawings.

FIG. 1 presents an overview of an adaptive digital data processing system. Main functional elements of such a system include: a preliminary primary input 1; a preliminary secondary input 2; a primary input 5; a secondary input 6; an output 8; a logic processor 7 for producing the output based at least in part on the primary input and secondary input; a primary input processor 3, taking as its input the preliminary primary input, and producing as its output the primary input for the logic processor; and a secondary input processor 4, taking as its input the preliminary secondary input, and producing as its output the secondary input for the logic processor, wherein the production of the secondary input by the secondary input processor is performed at least in part based on control information supplied with and/or derived from the preliminary primary input, causing the secondary input for the processing logic to be in same digital signal frame phase as its primary input, to enable primary input content adaptive and synchronized, zero-buffering data processing.

In embodiments, the preparing of the binary values of the secondary input, including its overhead and payload fields as well as auxiliary control bit wires (see e.g. selector 23 departing from secondary input 6 in FIG. 2) is performed by processing, at the secondary input processor 4, overhead bit fields and/or auxiliary control bit values of the preliminary primary input 1.

Regarding the drawings and related descriptions herein, please note that all input and output signals can in embodiments of the invention comprise a number of parallel data and control bit wires. It is also possible that any signal herein generally referred to as an input or output in singular, can in various embodiments comprise multiple logical input or output signals.

The primary input processor 3 of FIG. 1 generally matches the processing clock cycle delay of the secondary input processor 4 by providing a sequence of digital delay elements (e.g. flip-flop registers) either as a straight shift-register or with processing logic in between the delay elements, in either case allowing sufficient processing time for the processor 4 to prepare the secondary input 6 for the logic processor 7 at the same digital signal frame phase as the primary input. In an embodiment of the invention, the processing logic within the primary input processor 3 involves setting the primary input carrier signal overhead bit fields to proper values for the output 8 as that output signal is to be sent on a network, according to applicable network protocol standards; the preliminary primary input generally has such overhead bit fields in their un-processed values.

For Synchronous Digital Hierarchy (SDH) based carrier signal applications, the processing logic between the flip flop registers of the primary input processor 3 can for instance include setting, for the primary input 5, the Administrative Unit (AU) pointer byte values into their appropriate code values for the signal adapted to the node clock of the logic processor 7, and masking the AU to Alarm Indication Signal (AIS) when necessary. In such applications, the data signal of the preliminary primary input 1 is typically accompanied by auxiliary control signal wires that indicate the phasing of the payload (e.g. Virtual Containers carried in AUs) frames and the potential presence of AIS, as derived from upstream processing (including, in SDH based applications, section overhead termination and pointer interpretation logic), so that the preliminary input, as used by the secondary input processor 4, does not need to have such information coded into the actual data signal (as is needed e.g. in case of the output 8 that in wide-are-network applications is to be sent over a network in a single-bit-wide serial form without any parallel control bits).

In other embodiments where the primary input processor 3 consists of plain shift registers simply to delay the primary input 5 so as to allow enough digital signal clock cycles for the secondary input processor 4 to prepare the secondary input 6 based (in part) on the overhead information of the preliminary primary input 1, the preliminary primary input 1, except for being advanced in its digital signal frame phase compared with the primary input 5 by given desired number of multiplexing clock cycles, is identical with the primary input as it arrives on the logic processor 7.

Description of an embodiment of a secondary input processor is included in the reference [1], e.g. regarding its FIG. 4, including its related paragraphs 0033-0042. In reference [1], please note that its module 43 is equitable, in certain applications of the invention, to processor 4 of the present application. Regarding FIG. 4 of [1], as well as FIG. 1 of this application, please further note that certain embodiments may omit the secondary external input altogether, in favor of relying on logic and pre-existing data within the system, e.g. at secondary processor 4 or accessible by it in a digital memory such as RAM. Moreover, in various embodiments, equals of primary and secondary inputs, preliminary versions thereof and related processors, may have different names depending on the applications in question. For instance, where appropriate for the given application, what is here referred to as the primary input processor and the logic processor, may also be referred to as the data path, and what is here referred to as the secondary input processor, may also be referred to as the control logic. As well, equals of modules 2, 4, 7, and 20 of FIGS. 1 and 2 may be combined in whole or in part with other modules, subdivided, and/or duplicated etc., however without deviating from the spirit and scope of the invention presented herein, involving a mechanism of using a preliminary version of a primary data input to prepare in advance auxiliary input(s) used, along with the primary input, in producing processing system output(s).

Figure 2:
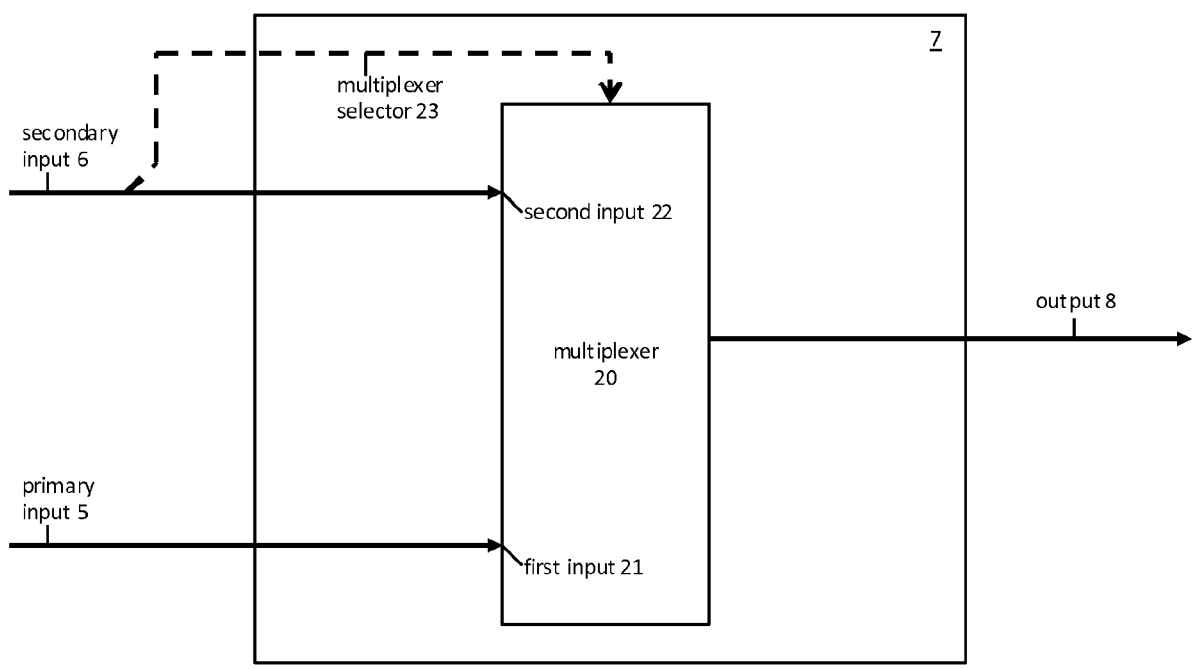
FIG. 2 illustrates an example of the logic processor of FIG. 1 for applications of the invention where the data processing comprises adaptive multiplexing, in accordance with an embodiment of the invention.

FIG. 2 illustrates an example of the processing logic 7 for adaptive digital signal multiplexing applications. In such an embodiment, the logic processor comprises a data multiplexer, such as, for a simple illustrative application, the basic 2:1 multiplexer 20 shown in the example of FIG. 2.

As seen from FIG. 2, the set of data inputs for the multiplexer 20 comprises the first input 21 and the second input 22, which, if taken from the system of FIG. 1, respectively are the primary input 5 and secondary input 6 for the logic processor 7. The selector input 23 for the multiplexer 20 determines whether the multiplexer selects a data bit to a given output bit timeslot from its first input or its second input. For instance, in a given implementation scenario, for any given multiplexing bit lane (of a potential parallel digital signal bus) and on any given multiplexing timeslot, the multiplexer 20 connects to its output 8 the bit from its second input 22 whenever the selector 23 value is at its active state, e.g. binary '1', while otherwise the multiplexer selects the bit to such given output bit timeslot from its first input 21. In embodiments, the selector 23, brought to the processing logic 7 together with the secondary input 6, is prepared by the secondary input processor 4 at least in part based on bit values of the preliminary primary input 1, which, per FIG. 1, is connected besides to the primary input processor 3 and thereon to the primary input 5 of the processing logic, also to the secondary input processor 4.

In various embodiments for adaptive multiplexing, the multiplexer 20 can naturally have greater number of inputs than just two; for such extensions of the herein illustrated inventive concepts, any N-bit (N is any positive integer) wide selector 23 allows supporting up to [2 exp (N)] multiplexing input lines.

The co-pending application [1] provides exemplary reference system specifications for application of aspects of the invention in the field of adaptive network multiplexing.

Reference [1], in particular in its FIGS. 1-3 and related descriptions, e.g. paragraphs 0021-0032, provides a detailed description for operation of aspects of the invention in a bit-timeslot-accurate adaptive multiplexing applications. For convenience of the reader when referring to [1] for such applications of the invention where the processing logic 7 of FIG. 1 comprises a multiplexer 20, the following parallels are applicable between the elements of FIG. 2 in the present application and elements of FIG. 3 of [1]:

| Element in FIG. 2: | Corresponding element in FIG. 3 of [1], for applications discussed in [1]: |
|---|---|
| primary input 5 | default input 30 |
| secondary input 6 | non-default input 31 |
| output 8 | downstream bus 9 |
| multiplexer 20 | data multiplexer 8 |
| selector 23 | non-default input status 10 (see descriptions e.g. in paragraphs 0033, 0040, 0043-44, 0046 and 0054-55 of [1], recalling that mapper 43 of [1] is here equitable to secondary input processor 4), becoming selector 15 |
| processing logic 7 | multiplexing system 1 (see also FIG. 1 in [1]; both elements 7 and 20 here and element 1 in [1] allow expansion to cross-connect formations 49 of FIG. 4 of [1]) |

Operation Principles:

The adaptive data processing method according to the invention comprises as its main functional process steps (1) preparing a primary input for a first input of a logic processor, based at least in part on a preliminary primary input, (2) preparing a secondary input for a second input of the logic processor, based at least in part on a preliminary secondary input; and (3) producing, by the logic processor, an output, based at least in part on the primary and the secondary inputs, wherein the function of preparing the secondary input is performed at least in part based on the contents of the preliminary primary input, including its overhead and control bit values. The invented method thus causes the secondary input to arrive at the logic processor in same digital signal frame phase as the primary input, enabling primary input content adaptive, synchronized data processing with minimized latencies.

In certain applications of the invention, such as shown in FIG. 2 of this application and e.g. FIG. 3 of the reference [1] and their related descriptions, the logic processor 7 (FIG. 1) comprises a multiplexer. In embodiments for such adaptive multiplexing applications, the multiplexer further has a selector input whose value for at least certain multiplexing bit timeslots is formed at least in part by the secondary input processor. In such embodiments furthermore, the value of the selector input, to determine whether the multiplexer is to select a data bit to a given output signal bit timeslot from its first or second input, is formed by the secondary input processor at least in part based on bit values of the preliminary primary input, including its embedded overhead bit fields and any auxiliary control bit wires.

The referenced co-pending application [1], as well as its own references, provide exemplary reference system specifications for applications of aspects of the invention where the logic processor comprises a digital multiplexer operating in a data load adaptive bandwidth physical layer connectivity based network system.

Benefits of invented content adaptive data processing techniques include the ability for the secondary signal processing and the data path control logic to act on the same data frame phase as the primary signal passing through such adaptive processing stage. Enabled by the invention, secondary input control information within the primary input, by the time (i.e. in data path clock cycles) at which instances of such control information already appear in or at least affect the primary output of such adaptive logic processor, such instances of the control information received from the primary input have already had their effect in preparing values for the secondary input, which, in turn, affects the primary data processing (e.g. in adaptive multiplexing applications, in impacting the control of from which of the multiplexing inputs such adaptive multiplexer is to select which data bits for any given primary output signal bit timeslot). For instance, in case it took a given number (e.g. four) processing logic clock cycles i.e. primary signal (byte) timeslots to prepare the secondary input for the processing logic based (in part) on the preliminary primary input, the preliminary primary input is to be such number (four) of clock cycles advanced in its frame phase compared with the primary input to the logic processor, enabling the preparation of the secondary input, i.e., in turn, control for the primary data processing, by up to that number (four) of primary input byte timeslots before the applicable primary input byte timeslots to be processed arrive on the logic processor. As such, the invention enables the use of control information from overhead fields of given data frames in controlling the data processing within already the same signal frames, instead of only the following ones. In applications such as data packet by packet load adaptive primary network capacity allocation optimization, such benefits are seen to been of critical importance for effectiveness of such optimization process in maximizing the primary network on-time data throughput.

Similar benefits arising from the invented content adaptive, synchronous "digital assembly line" data path and control architecture are expectable also for various other applications, such as web application clients and servers (e.g. HTTP(S), TLS, binary wire protocol, etc.) and alike online transaction and protocol processing agents, engines and accelerators.

Moreover, further benefits of using embodiments of the invention where the processing logic (between the delay elements, e.g. flip-flop registers) within the primary input processor involves setting the primary input carrier signal overhead bit fields to their proper outgoing values time wise in parallel while the preliminary primary input is being used to prepare the secondary input for controlling the primary data path processing logic, include reduced need for registers and wiring, and reduced delay (due to elimination of the need for data buffering) along with simpler and faster system design, implementation and verification due to the reduction in the number of versions of signals in different frame phases as well as due to reduction in wiring etc. logic implementation costs. All such factors naturally improve also the overall cost-efficiency and scalability of the invented content-adaptive, synchronous data path processing architecture.

Generally, based on the invented techniques enabling preparing the data path control, even when such preparation takes multiple data path clock cycles, in time for any given timeslot of the data to be processed without having to buffer the data, allow simultaneously achieving synchronous, line rate hardware logic operation based predictable, reliable and high-performance networked data processing, along with optimized network and processing system utilization efficiency and maximized overall system throughput, based on scalable, low cost logic processing architecture.

Accordingly, the invention enables continuously maximizing network and data path processing throughput for variable load rate networked applications. Various other types of applications of the invented advanced timing control based adaptive data processing mechanisms naturally are possible as well.

CONCLUSIONS

This detailed description is a specification of embodiments of the invention for application examples and illustrative system operation scenarios discussed in the foregoing. Specific application, architectural and logic implementation examples are provided in this and the referenced patent applications for the purpose illustrating possible reference implementations of the invented concepts, as well as related utilization scenarios. Naturally, there are multiple alternative ways to implement or utilize, in whole or in part, the principles of the invention as set forth in the foregoing.

Generally, those skilled in the art will be able to develop different versions and various modifications of the described embodiments, which, although not necessarily each explicitly described herein individually, rely on the principles of the invention, and are thus included within its spirit and scope. It is thus intended that the specification and drawings be considered not in a restrictive sense, but as exemplary only, with a true scope of the invention being indicated by the following claims.

What is claimed is:

1. An adaptive digital data processing system, comprising:
a preliminary primary input;
a preliminary secondary input;
a primary input;
a secondary input;
an output;
a logic processor for producing the output based at least in part on the primary input and the secondary input;
a primary input processor, taking as its input the preliminary primary input, and producing as its output the primary input for the logic processor; and
a secondary input processor, taking as its input the preliminary secondary input, and producing as its output the secondary input for the logic processor;
wherein the producing the secondary input by the secondary input processor is controlled at least in part by the preliminary primary input, to cause the primary input and the secondary input to arrive at the processing logic in same digital signal frame phase, and
wherein the primary input either: i) has certain overhead bit fields processed to appropriate values needed for the output, whereas the preliminary primary input has said certain overhead bit fields in their un-processed values, or ii) except for being delayed in its phase compared with the preliminary primary input by a given number of logic processor clock cycles, is identical with the primary input.

2. The system of claim 1, wherein bit values of the secondary input are prepared at least in part based on bit values of the preliminary primary input.

3. The system of claim 1, wherein contents for the secondary input during data processing operation of the system are sourced internally to the system.

4. The system of claim 1, wherein the logic processor comprises a multiplexer.

5. The system of claim 4, wherein a selector input for the multiplexer, to determine whether to select a data bit to a given output bit timeslot from the primary input or the secondary input, is prepared at least in part based on bit values of the preliminary primary input.

6. The system of claim 4, wherein a set of data inputs for the multiplexer comprises the primary input and the secondary input for the logic processor.

7. The system of claim 6, wherein the multiplexer further has a selector input whose value for at least certain multiplexing timeslots is formed at least in part by the secondary input processor.

8. An adaptive digital data processing method, comprising steps of:
preparing a primary input for a logic processor, based at least in part on a preliminary primary input;
preparing a secondary input for the logic processor, based at least in part on a preliminary secondary input; and
producing, by the logic processor, an output, based at least in part on the first input and the second inputs;
wherein the preparing of the secondary input is controlled at least in part by the preliminary primary input, to cause the primary input and the secondary input to arrive at the logic processor in same digital signal frame phase, and
wherein the primary input either: i) has certain overhead bit fields processed to appropriate values needed for the output, whereas the preliminary primary input has said certain overhead bit fields in their un-processed values, or ii) except for being delayed in its phase compared with the preliminary primary input by a given number of logic processor clock cycles, is identical with the primary input.

9. The method of claim 8, wherein bit values of the secondary input are prepared at least in part based on bit values of the preliminary primary input.

10. The method of claim 8, wherein the logic processor comprises a multiplexer.

11. The method of claim 10, wherein a selector input for the multiplexer, to determine whether to select a data bit to a given output bit timeslot from the primary input or the secondary input, is prepared at least in part based on bit values of the preliminary primary input.

12. The method of claim 10, wherein a set of data inputs for the multiplexer comprises the primary input and the secondary input for the logic processor.

13. The method of claim 12, wherein the multiplexer further has a selector input whose value for at least certain multiplexing timeslots is formed at least in part by the secondary input processor.

14. The method of claim 13, wherein the value of the selector input, to determine whether to select a data bit to a given output bit timeslot from the primary input or the secondary input, is prepared at least in part based on bit values of the preliminary primary input.

15. A process for adaptive digital data processing, comprising functions of:
   preparing a primary input from a preliminary primary input;
   preparing a secondary input from a preliminary secondary input; and
   producing an output from the primary input and the secondary input;
   wherein the preparing the secondary input is controlled at least in part by the preliminary primary input, to cause the secondary input to be in same digital signal frame phase as the primary input for producing the output, and wherein the primary input either: i) has certain overhead bit fields processed to appropriate values needed for the output, whereas the preliminary primary input has said certain overhead bit fields in their un-processed values, or ii) except for being delayed in its phase compared with the preliminary primary input by a given number of logic processor clock cycles, is identical with the primary input.

16. The process of claim 15, wherein the producing the output is done by multiplexing output signal bit timeslots from data bits of the primary input and the secondary input, with such multiplexing being controlled at least in part by the secondary input.

* * * * *